United States Patent
Byun

(10) Patent No.: US 9,960,931 B2
(45) Date of Patent: *May 1, 2018

(54) PROXY TUNNEL END POINT UNIT, COMMUNICATION SYSTEM FOR SCALABLE NETWORK VIRTUALIZATION HAVING THE SAME AND COMMUNICATION METHOD FOR SCALABLE NETWORK VIRTUALIZATION

(71) Applicant: ELECTRONICS AND TELECOMMUNICATIONS RESEARCH INSTITUTE, Daejeon (KR)

(72) Inventor: Sung Hyuk Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 110 days.

This patent is subject to a terminal disclaimer.

(21) Appl. No.: 14/822,994

(22) Filed: Aug. 11, 2015

(65) Prior Publication Data

US 2016/0065384 A1 Mar. 3, 2016

(30) Foreign Application Priority Data

Aug. 26, 2014 (KR) .................. 10-2014-0111792

(51) Int. Cl.
  *H04L 12/46* (2006.01)
(52) U.S. Cl.
  CPC ............................ *H04L 12/4633* (2013.01)

(58) Field of Classification Search
None
See application file for complete search history.

(56) References Cited

U.S. PATENT DOCUMENTS

| 8,223,770 B2 | 7/2012 | Wray et al. |
| 2007/0097968 A1* | 5/2007 | Du .................. H04L 12/4666 370/389 |
| 2012/0093156 A1 | 4/2012 | Budhani et al. |
| 2013/0067086 A1 | 3/2013 | Hershko et al. |

(Continued)

FOREIGN PATENT DOCUMENTS

| KR | 1020090010951 | 1/2009 |
| KR | 1020130068383 | 6/2013 |

*Primary Examiner* — Nicholas Sloms
(74) *Attorney, Agent, or Firm* — Ladas & Parry LLP

(57) ABSTRACT

Provided herein is a proxy tunnel end point apparatus including a tunnel management unit configured to generate a tunnel; a VNID management unit configured to generate a VSI for a VNID; a tunnel packet end point unit configured to terminate the tunnel, extract VNID information from the packet, and transmit the terminated L2 packet to the VSI corresponding to the VNID; a VSI unit having a virtual port corresponding to each terminated tunnel in the tunnel packet end point unit, and configured to perform L2 switching on the terminated L2 packet transmitted from the tunnel packet end point unit and to transmit the L2 packet to a destination virtual port; and a tunnel packet generation unit configured to transmit the packet to a second tunnel end point unit of a destination of transmission, based on a destination virtual port information.

7 Claims, 4 Drawing Sheets

(56) References Cited

U.S. PATENT DOCUMENTS

| | | | | |
|---|---|---|---|---|
| 2013/0322453 A1* | 12/2013 | Allan | .................. | H04L 12/4662 370/395.53 |
| 2015/0263862 A1* | 9/2015 | Sugyou | ............... | H04L 12/6418 370/390 |
| 2015/0365313 A1* | 12/2015 | Chiba | ................. | H04L 12/6418 370/254 |

* cited by examiner

| New Eth header | L3-DA (Proxy TEP) | L3-SA (source TEP) | VN header (VNID) | L2 header | L3 header | Payload | tunnel header / original packet

| New Eth header | L3-DA (Dest.TEP) | L3-SA (Proxy TEP) | VN header (VNID) | L2 header | L3 header | Payload | tunnel header / original packet

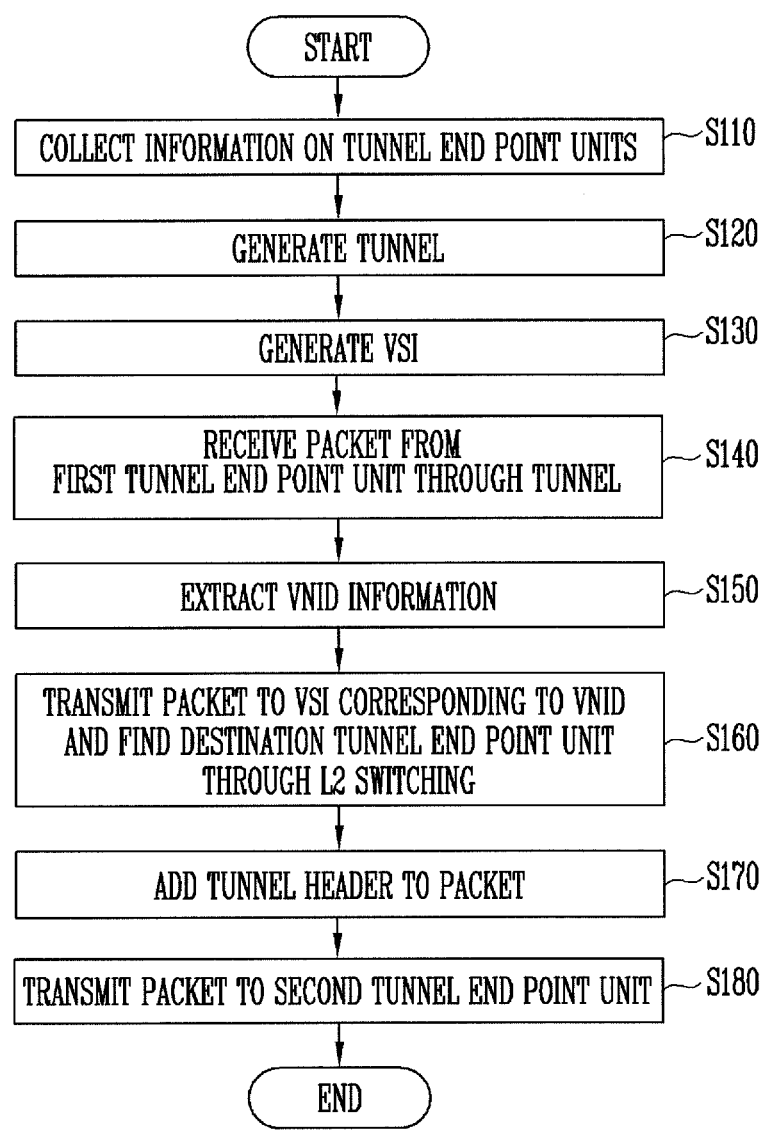

PROXY TUNNEL END POINT UNIT, COMMUNICATION SYSTEM FOR SCALABLE NETWORK VIRTUALIZATION HAVING THE SAME AND COMMUNICATION METHOD FOR SCALABLE NETWORK VIRTUALIZATION

CROSS-REFERENCE TO RELATED APPLICATION

The present application claims priority to Korean patent application number 10-2014-0111792, filed on Aug. 26, 2014, the entire disclosure of which is incorporated herein in its entirety by reference.

BACKGROUND

Field of Invention

Various embodiments of the present disclosure relate to a proxy tunnel end point apparatus, a communication system and method for scalable network virtualization having the same, and more particularly, to a proxy tunnel end point apparatus with reduced configuration complexity, a communication system and method for scalable network virtualization having the same.

Description of Related Art

An overlay network virtualization method wherein a virtual network is configured with a virtual machine without being affected by the configuration of an underlay network in an IDC (Internet Data Center)-based cloud environment is entering into general use. Representative examples of this technology include VXLAN (virtual extensible local area network) and NVGRE (network virtualization using generic routing encapsulation). According to this technology, in order to configure a layer 2 virtual network, a tunnel is set between virtual machines existing in different servers so that traffic may be exchanged therebetween. Herein, in order to process multicast traffic such as flooding etc., if an underlay IP network supports multicast, it is better to use a multicast tunnel, but since most of today's IP networks do not support multicast, VXLAN or NVGRE solutions use full-mesh unicast tunnel methods instead of multicast tunnel methods. Furthermore, even when a multicast tunnel is being used for a non-unicast packet, for a unicast packet, a full-mesh unicast tunnel must be set between nodes belonging to a virtual network.

FIG. 1 illustrates a conventional communication system for network virtualization. In each of a plurality of node units 11, 12, 13, 14, each of a first to $N^{th}$ tunnel end point units 21, 22, 23, 24 is included, respectively. Furthermore, to each of the first to $N^{th}$ tunnel end point units 21, 22, 23, 24, each of a plurality of VMs (Virtual Machines) 31, 32, 33, 34 is connected, respectively. Herein, in a network having N node units, up to N*(N−1) unicast tunnels 40 must be set for one virtual network, and thus the complexity of setting/managing the network significantly increases to as much as O(N^2). Therefore, depending on limitations to the number of tunnels that may be made in one node unit, the size of an overlay type network virtualization domain is limited.

SUMMARY

A first purpose of the present disclosure is to realize a communication technology for network virtualization having reduced configuration complexity. Another purpose of the present disclosure is to realize a communication technology for network virtualization with increased scalability.

An embodiment of the present disclosure provides a proxy tunnel end point apparatus including a tunnel management unit configured to generate a tunnel to be connected to each of a plurality of tunnel end point units of a plurality of node units that include a first node unit and second node unit; a VNID management unit configured to generate a VSI (Virtual Switching Instance) for each VNID (Virtual Network Identifier), which is set for each virtual network; a tunnel packet end point unit configured to receive a packet through the tunnel connected to a first tunnel end point unit of the first node unit and to terminate the tunnel, extract VNID information from a tunnel header of the packet, and transmit the terminated L2 packet to the VSI corresponding to the VNID; a VSI unit having a virtual port corresponding to each terminated tunnel in the tunnel packet end point unit, and configured to perform L2 switching on the terminated L2 packet transmitted from the tunnel packet end point unit and to transmit the L2 packet to a destination virtual port; and a tunnel packet generation unit configured to transmit the packet to a second tunnel end point unit of the second node unit that is a destination of transmission, based on destination virtual port information.

Herein, the tunnel packet generation unit may add to the packet an L3 tunnel header that has an IP address of the tunnel end point unit associated with a VSI output virtual port of the packet as a destination address and an IP address of the proxy tunnel end point unit as a source address.

Herein, the tunnel management unit may generate the virtual port corresponding to each of the tunnel end point units on the VSI or for only tunnel end point units belonging to the VNID that the VSI represents, and use the virtual port to transmit the packet from the tunnel packet end point unit to the tunnel packet generation unit.

Herein, the tunnel generated by the tunnel management unit may be a unicast tunnel.

Another embodiment of the present disclosure provides a communication method for scalable network virtualization, the method including: collecting information on each of a plurality of tunnel end point units of a plurality of node units that include a first node unit and second node unit; generating a tunnel to be connected to the each tunnel end point unit of the plurality of node units; generating a VSI (Virtual Switching Instance) for each VNID (Virtual Network Identifier), the VNID being set for each virtual network; receiving a packet from a first tunnel end point unit of the first node unit through the tunnel connected to the first tunnel end point unit of the first node unit; extracting information on the VNID where the packet belongs to from a tunnel header of the packet, and transmitting the terminated L2 packet to the VSI corresponding to the VNID; having, by a VSI unit, a virtual port corresponding to the tunnel that terminated in the tunnel packet end point unit, inputting the terminated L2 packet transmitted from the tunnel packet end point unit to the virtual port of the corresponding tunnel, performing L2 switching based on header information of the L2 packet, and transmitting the L2 packet to a destination virtual port; and transmitting the packet to a second tunnel end point unit of the second node unit that is a destination of transmission based on destination virtual port information.

Herein, the method may further include after switching of terminated L2 packet in the VSI corresponding to the VNID, adding to the packet a L3 tunnel header having an IP address of the tunnel end point unit associated with a VSI output virtual port of the packet as a destination address, and having an IP address of a proxy tunnel end point unit as a source address.

Herein, the method may further include after the generating of a VSI, generating the virtual port corresponding to each of the tunnel end point units on the VSI or generating the virtual port for only tunnel end point units belonging to the VNID that the VSI represents, and transmitting the packet to the second tunnel end point unit via the virtual port.

Another embodiment of the present disclosure provides a communication system for scalable network virtualization, the system including: a plurality of node units including a first node unit and second node unit, each node unit including a tunnel end point unit; and a proxy tunnel end point unit configured to generate a tunnel to be connected to each of the tunnel end point units of each of the plurality of node units, to receive a packet from a first tunnel end point unit of the first node unit through the tunnel connected to the first tunnel end point unit of the first node unit, and to transmit the packet to a second tunnel end point unit of the second node unit that is a destination of transmission.

Herein, the proxy tunnel end point unit may include a tunnel management unit configured to generate the tunnel to be connected to the each tunnel end point unit of the each of the plurality of node units including the first node unit and second node unit; a VNID management unit configured to generate a VSI (Virtual Switching Instance) for each VNID (Virtual Network Identifier), which is set for each virtual network; a tunnel packet end point unit configured to receive a packet through the tunnel connected to a first tunnel end point unit of the first node unit, extract VNID information on where the packet belongs to from the packet, and transmit the terminated L2 packet to the VSI corresponding to the VNID; a VSI unit having a virtual port corresponding to the tunnel terminated in the tunnel packet end point unit, and configured to perform L2 switching on the terminated L2 packet transmitted from the tunnel packet end point unit and to transmit the L2 packet to a destination virtual port; and a tunnel packet generation unit configured to transmit the packet to a second tunnel end point unit of the second node unit that is a destination of transmission based on destination virtual port information.

Herein, the system may further include an additional proxy tunnel end point unit configured in parallel to the proxy tunnel end point unit, and configured to perform a same operation as the proxy tunnel end point unit for additional VNID.

Herein, in response to a new VNID being added, the system may set the new VNID to the proxy tunnel end point unit or the additional proxy tunnel end pint unit.

According to the aforementioned embodiments of the present disclosure, when configuring an overlay type virtual network, it is possible to reduce the complexity by reducing the number of unicast tunnels to be set. By doing this, it is possible to realize a communication technology for network virtualization with increased seal ability.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a flowchart for explaining a communication method for scalable network virtualization according to the embodiment of the present disclosure.

DETAILED DESCRIPTION

Figure 1:
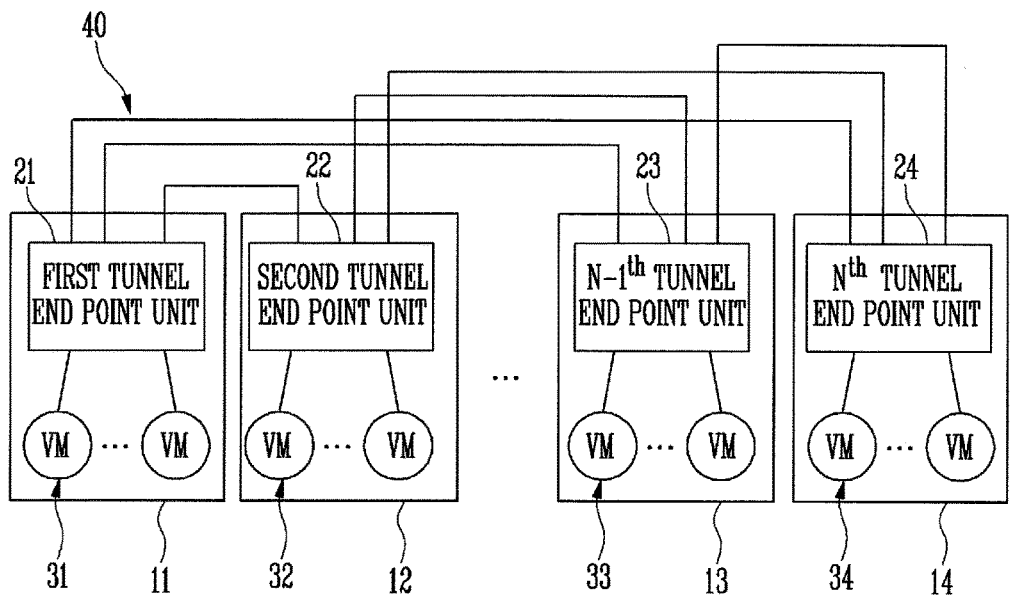
FIG. 1 illustrates a conventional communication system for network virtualization.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Figure 2:
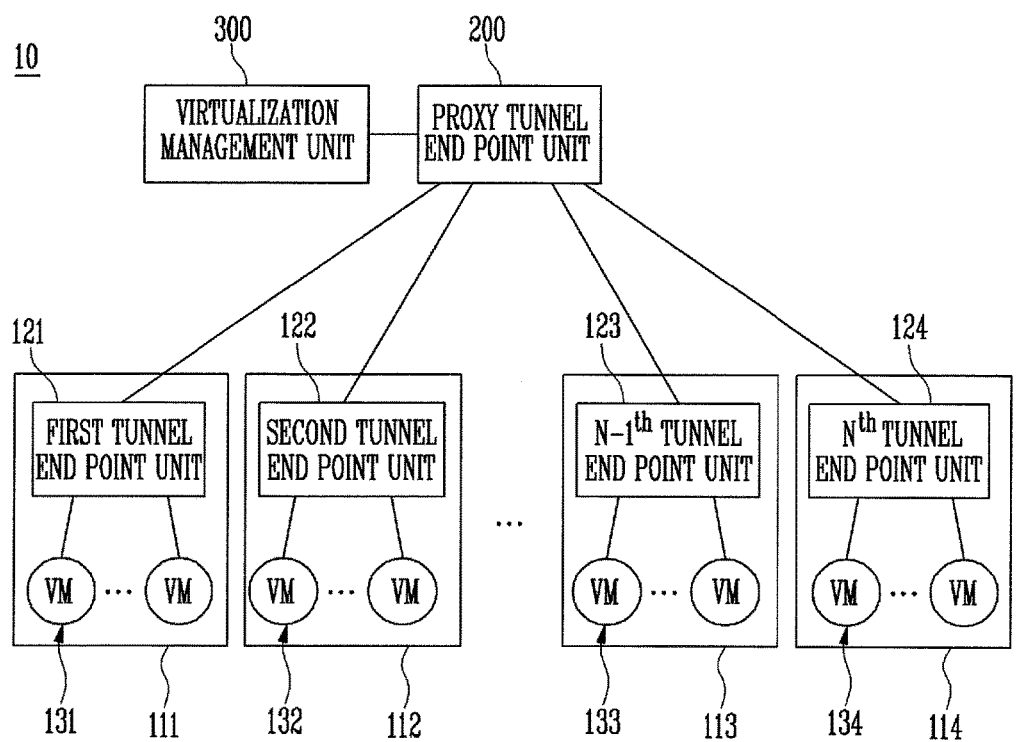
FIG. 2 illustrates a communication system for scalable network virtualization according to an embodiment of the present disclosure.
Figures 3, 4, 5:
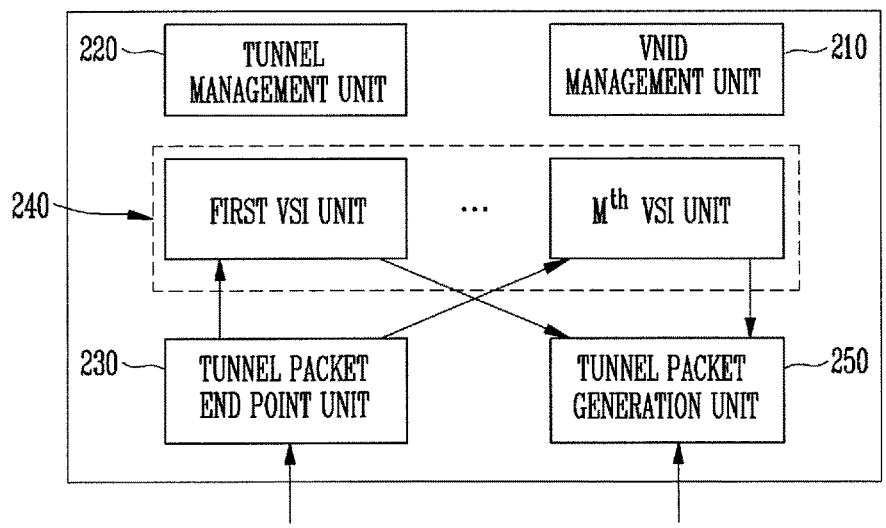
FIG. 3 illustrates a block diagram for explaining a proxy tunnel end point apparatus in the communication system for scalable network virtualization according to the embodiment of the present disclosure.
FIG. 4 illustrates a packet structure to be transmitted from a tunnel end point unit to the proxy tunnel end point apparatus in the communication system for scalable network virtualization according to the embodiment of the present disclosure.
FIG. 5 illustrates a packet structure to be transmitted from the proxy tunnel end point apparatus to the tunnel end point unit in the communication system for scalable network virtualization according to the embodiment of the present disclosure.

FIG. 2 illustrates a communication system for scalable network virtualization according to an embodiment of the present disclosure. FIG. 3 is a block diagram for explaining a proxy tunnel end point apparatus in the communication system for scalable network virtualization according to the embodiment of the present disclosure.

Referring to FIG. 2, the communication system for scalable network virtualization according to the embodiment of the present disclosure 10 includes a plurality of node units 111, 112, 113, 114, a proxy tunnel end point unit 200, and a virtualization management unit 300.

Each of the plurality of node units 111, 112, 113, 114 includes a tunnel end point unit: a first to $N^{th}$ tunnel end point units 121, 122, 123, 124, respectively. Furthermore, to each of the first to $N^{th}$ tunnel end point units 121, 122, 123, 124, each of a plurality of VM (Virtual Machines) 131, 132, 133, 134 may be connected, respectively. Herein, each of the plurality of node units 111, 112, 113, 114 may serve as a transmitting node unit or a receiving node unit. Hereinafter, explanation will be made based on an assumption that the first node unit 111 is a transmitting node unit, and the second node unit 112 is a receiving node unit.

The proxy tunnel end point unit 200, that is, a proxy tunnel end point apparatus generates a tunnel to be connected to each of the tunnel end point units 121, 122, 123, 124 of the plurality of node units 111, 112, 113, 114, and receives a packet from the first tunnel end point unit 121 of the first node unit 111 through the tunnel. Furthermore, the proxy tunnel end point unit 200 extracts an original L2 packet from the received packet, finds a destination of transmission through L2 switching, adds a new tunnel header suitable to the destination of transmission, and transmits the packet to the second tunnel end point unit 122 of the second node unit 112, that is the destination of transmission.

Specifically, referring to FIG. 3 as well, the proxy tunnel end point unit 200 may include a VNID management unit 210, tunnel management unit 220, tunnel packet end point unit 230, VSI unit 240, and tunnel packet generation unit 250.

The VNID management unit 210 may generate a VSI (Virtual Switching Instance) for each VNID (Virtual Network Identifier) set for each virtual network configured between the proxy tunnel end point unit 200 and each of the tunnel end point units 121, 122, 123, 124 through a tunnel connected to each of the tunnel end point units 121, 122, 123, 124 of the plurality of node units 111, 112, 113, 114. Herein, the VNID refers to an identifier of an L2 overlay virtual network that is referred to as a Tenant.

The tunnel management unit 220 generates the tunnel to be connected to each of the tunnel end point units 121, 122, 123, 124 of the plurality of node units 111, 112, 113, 114. Herein, the tunnel may be a unicast tunnel. Furthermore, the tunnel management unit 220 may either generate a virtual port for each VSI unit 240 in response to each of the tunnel end point units 121, 122, 123, 124, or generate a virtual port for only the tunnel end point units belonging to a VNID that the VSI represents. Using the virtual port, the packet may be transmitted from the tunnel packet end point unit 230 that will be explained hereinafter to the tunnel packet generation unit 250.

The tunnel packet end point unit 230 receives a packet from the first tunnel end point unit 121 of the first node unit 111 through the tunnel. Furthermore, the tunnel packet end point unit 230 extracts VNID information from a tunnel header of the packet, and transmits the packet to a VSI corresponding to the VNID.

The VSI unit 240 includes a plurality of VSIs each corresponding to a VNID by the tunnel packet end point unit 230. Such a VSI unit transmits the packet received from the tunnel packet end point unit 230 to the tunnel packet generation unit 250. Specifically, the VSI unit 240 has a virtual port corresponding to a tunnel terminated in the tunnel packet end point unit 230, and is configured to input the terminated L2 packet transmitted from the tunnel packet end point unit 230 to a virtual port of a corresponding tunnel, performs L2 switching that includes at least one of mac learning, and flooding of unknown unicast packet and non-unicast packet based on the header information of the L2 packet, and transmits the L2 packet to a destination virtual port.

The tunnel packet generation unit 250 transmits the packet to the second tunnel end point unit 122 of the second node unit 112 that is the destination of transmission based on information of the destination of transmission of the packet transmitted from the VSI unit. Herein, the tunnel packet generation unit 250 may add an L3 tunnel header having an IP address of the tunnel end point unit associated with the VSI output virtual port of the packet, and having an IP address of the proxy tunnel end point unit as a source address.

In overlay based network virtualization, the L2 packet is tunneled and then exchanged. FIGS. 4 and 5 illustrate a structure of a packet. FIG. 4 illustrates a packet structure to be transmitted from a tunnel end point unit to the proxy tunnel end point apparatus in the communication system for scalable network virtualization according to the embodiment of the present disclosure. FIG. 5 illustrates a packet structure to be transmitted from the proxy tunnel end point apparatus to a tunnel end point unit in the communication system for scalable network virtualization according to the embodiment of the present disclosure. The tunnel end point unit transmits all packets to only the proxy tunnel end point unit 200 instead of a tunnel end point unit that is the destination of transmission. Therefore, as in FIGS. 4 and 5, a destination L3 address of all packets being transmitted to the tunnel end point unit is an L3 address of the proxy tunnel end point unit 200.

The virtualization management unit 300 refers to a net management system configured to generate and manage a virtual network, and it may be an NSX of VMware.

Hereinafter, a communication system for scalable network virtualization according to another embodiment of the present disclosure will be explained.

Figure 6:
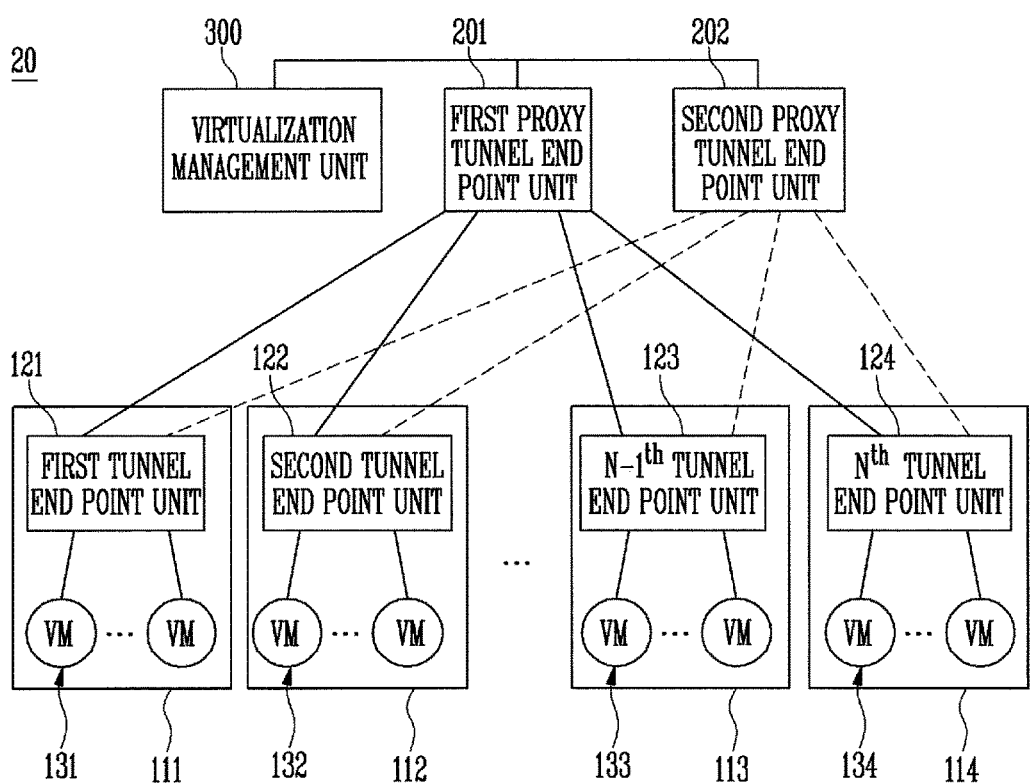
FIG. 6 illustrates a communication system for scalable network virtualization according to another embodiment of the present disclosure.

FIG. 6 illustrates the communication system for scalable network virtualization according to the another embodiment of the present disclosure.

Referring to FIG. 6, the communication system for scalable network virtualization according to the another embodiment of the present disclosure 20 is configured to have a different structure of the proxy tunnel end point unit from that in the communication system for scalable network virtualization 10 of FIG. 2. Therefore, hereinafter, explanation on the communication system for scalable network virtualization according to the another embodiment of the present disclosure will be made with the main focus on the proxy tunnel end point unit, and like numerals will be used for like components, and detailed explanation will be omitted.

The communication system for scalable network virtualization according to the another embodiment of the present disclosure 20 includes a plurality of node units 111, 112, 113, 114, a first proxy tunnel end point unit 201, a second proxy tunnel end point unit 202, and a virtualization management unit 300.

The first proxy tunnel end point unit 201 is configured to have a same structure as the proxy tunnel end point unit 200 of FIG. 2. Furthermore, the second proxy tunnel end point unit 202 is configured to be in parallel to the first proxy tunnel end point unit 201, and to perform same operations as the first proxy tunnel end point unit 201 for additional VNID. For example, when using 2000 virtual networks from VNID 1 to 2000 in a virtual domain, the first proxy tunnel end point unit 201 may be set to support VNID 1 to 1000, while the second proxy tunnel end point unit 202 is set to support VNID 1001 to 2000. Furthermore, each tunnel end point is connected to the two proxy tunnel end point units: the first proxy tunnel end point unit 201 and the second proxy tunnel end point unit 202 through a tunnel, packets belonging to VNID 1 to 1000 may be transmitted to the first proxy tunnel end point unit 201, while packets belonging to VNID 1001 to 2000 are transmitted to the second proxy tunnel end point unit 202. That is, traffic inside the network is distributed over the two proxy tunnel end point units: the first proxy tunnel end point unit 201 and the second proxy tunnel end point unit 202.

Herein, in the case of adding a new VNID, the new VNID is set to the first proxy tunnel end point unit 201 or the second proxy tunnel end point unit 202. Furthermore, information on the first proxy tunnel end point unit 201 or the second proxy tunnel end point unit 202 to which the new VNID is set may be notified to each of the plurality of tunnel end point units 121, 122, 123, 124 of each of the plurality of node units 111, 112, 113, 114, so as to form a tunnel for the new VNID between the tunnel end point units 121, 122, 123, 124 and the first proxy tunnel end point unit 210 or the second proxy tunnel end point unit 202 to which the new VNID is set.

Furthermore, FIG. 6 illustrates a configuration where two proxy tunnel end point units are formed, but depending on the number of VNID, three or more proxy tunnel end point units may be formed. Herein, the total number of proxy tunnel end point units formed may correspond to the number of core switches of the communication system for scalable network virtualization. Furthermore, the proxy tunnel end point unit may be positioned in a core switch or TOR (Top of Rack) switch of the communication system for scalable network virtualization.

Hereinafter, a communication method for scalable network virtualization according to the embodiment of the present disclosure will be explained.

FIG. 7 is a flowchart for explaining the communication method for scalable network virtualization according to the embodiment of the present disclosure.

Referring to FIG. 7, first of all, the communication method for scalable network virtualization according to the embodiment of the present disclosure collects information on each tunnel end point unit of each of a plurality of node units that include a first node unit and second node unit (S110).

Furthermore, the method generates a tunnel to be connected to each of the tunnel end point units of each of the plurality of node units (S120).

Then, the method generates a VSI (Virtual Switching Instance) for each VNID (Virtual Network Identifier) set for each virtual network configured with each of the tunnel end point units through each tunnel (S130). After S130, the method may generate a virtual port for each VSI corresponding to each of the tunnel end point units or for only tunnel end point units belonging to the VNID that the VSI represents.

The method receives a packet from the first tunnel end point unit of the first node unit through the tunnel (S140).

Then, the method extracts VNID information from a tunnel header of the packet received at S140 (S150). Then, the VSI unit may include a virtual port corresponding to the tunnel that terminated in the tunnel packet end point unit, input the terminated L2 packet transmitted from the tunnel packet end point unit to the virtual port of the corresponding tunnel, and perform L2 switching that includes at least one of mac learning, and flooding of the unknown unicast packet, and non-unicast packet based on the header information of the L2 packet, and transmit the L2 packet to a destination virtual port. The L2 packet including the destination virtual port information may be transmitted to the tunnel packet generation unit (S160).

The tunnel packet generation unit may add to the packet an L3 tunnel header wherein an IP address of the tunnel end point unit associated with the VSI output virtual port of the packet is a destination address, and an IP address of the proxy tunnel end point unit is a source address (S170).

Furthermore, the method transmits the packet to the destination of transmission, that is the second tunnel end point unit of the second node unit (S180).

The scalable network virtualization method of the present disclosure may be realized in the format of a program command that may be performed through various computer means, and be recorded in a computer readable medium. The computer readable medium may include a program command, data file, or data structure, or a combination thereof. The program command to be recorded in the medium may be one that has been specially designed and configured for the present disclosure or may be one that is well known and available to those in the computer software field. Examples of a computer readable record medium include all kinds of hardware apparatuses specially configured to store and perform programs such as magnetic media such as hard disks, floppy disks, and magnetic tape; optical media such as CD-ROMs and DVDs; magneto-optical media such as floptical disks; ROMs, RAMs, and flash memory etc. Examples of program commands include not only mechanical language codes made by compilers but also sophisticated language codes that may be executed by computers using interpreters. Such a hardware apparatus may be realized into one or more software modules for performing operations of the present disclosure, and vice versa.

Teachings of the principles of the present disclosure may be realized by a combination of hardware and software. Furthermore, software may be realized into an application program to be actually realized in a program storage unit. The application program may be uploaded to a machine including any appropriate architecture and may be executed by the machine. Preferably, the machine may be realized on a computer platform having one or more hardware such as a CPU, computer processor, random access memory (RAM), and input/output (I/O) interface. Furthermore, the computer platform may include an operating system and micro command code. Various processes and functions explained herein may be a portion of a micro command code, application program or a combination thereof, and may be executed by various processing apparatuses including CPU. Additionally, various peripheral apparatuses such as an additional data storage unit and printer may be connected to the computer platform.

Since a portion of the system components and methods illustrated in the attached drawings is preferably realized into software, it should be understood that actual accesses between system components or process function blocks may differ depending on the principles of the present disclosure being programmed. Given the teachings of the present disclosure, those skilled in the art would be able to take into account the principles of the present disclosure and similar embodiments or configurations.

In order to reduce the management complexity of configuring full-mesh type unicast tunnel connections between tunnel end point units in an overlay based network virtualization method, the proxy tunnel end point apparatus according to an embodiment of the present disclosure, and a communication system and method for scalable network virtualization including the same reduce the number of unicast tunnels necessary in a network virtualization domain, from existing $O(N^2)$ to $O(N)$. And, by the aforementioned, the management of generation of a virtual network may be simplified. Furthermore, unlike in existing methods where the number of tunnel end point units that could be provided in one network virtualization domain is limited by the resource limitations such as the number of tunnels that may be generated in one equipment, the number of tunnel end point units that could be provided may be significantly increased, thereby presenting a scalable network virtualization method.

The aforementioned embodiments of the proxy tunnel end apparatus according to the present disclosure, and a communication system and method for scalable network virtualization including the same may not only be limitedly applied, but also a portion or entirety of each embodiment may be combined to realize various modifications.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A proxy tunnel end point apparatus comprising one or more processors in a proxy tunnel end point unit of the proxy tunnel end point apparatus configured to:
   collect information on each of a plurality of tunnel end point units of a plurality of node units, respectively, that include a first node unit and second node unit;
   generate a tunnel for unicast to be connected to each tunnel end point unit of the plurality of node units
   generate a VSI (Virtual Switching Instance) corresponding to a VNID (Virtual Network Identifier), which is set for a virtual network using the tunnel;
   receive a packet through the tunnel from a first tunnel end point unit of the first node unit using a proxy tunnel end point unit, terminate the tunnel, extract VNID information related to the VNID where the packet belongs to a tunnel header of the received packet, and transmit a terminated L2 packet to the VSI corresponding to the VNID;
   generate a virtual port corresponding to the tunnel that terminated in the tunnel packet end point unit, inputting the terminated L2 packet from the tunnel packet end point unit to the virtual port of the corresponding tunnel, and perform L2 switching including mac learning and flooding of unknown unicast packet and non-unicast packets based on the header information of the L2 packet and to transmit the L2 packet to a destination virtual port; and
   add to the packet an L3 tunnel header that has an IP address of a tunnel end point unit associated with a VSI output virtual port of the packet as a destination address and an IP address of the proxy tunnel end point unit as a source address and transmit a tunneled packet to a second tunnel endpoint unit of the second node unit that is a destination of transmission, based on destination virtual port information at the VSI,
   wherein the first tunnel end point unit of the first node unit transmits all packets to only a proxy tunnel end point unit instead of a second tunnel end point unit of the second node unit,
   wherein a source L3 address of all packets being transmitted to the second tunnel end point unit is an L3 address of the proxy tunnel end point unit.

2. The apparatus according to claim 1, wherein the processors generate the virtual port corresponding to each of the tunnel end point units on the VSI or for only tunnel end point units belonging to the VNID that the VSI represents, and uses the virtual port to transmit the packet from the tunnel packet end point unit.

3. A communication method performed by a proxy tunnel end point apparatus for scalable network virtualization, the method comprising:
   collecting information on each of a plurality of tunnel end point units of a plurality of node units, respectively that include a first node unit and second node unit;
   generating a tunnel for unicast to be connected to the each tunnel end point unit of the plurality of node units;
   generating a VSI (Virtual Switching Instance) corresponding to a VNIDs (Virtual Network Identifier), which is set for a virtual network using the tunnel;
   receiving a packet from a first tunnel end point unit of the first node unit through the tunnel using a proxy tunnel end point unit and terminating the tunnel;
   extracting VNID information related to the VNID where the packet belongs to from a tunnel header of the received packet and transmitting a terminated L2 packet to the VSI corresponding to the VNID;
   generating a virtual port corresponding to the tunnel that terminated in the tunnel packet end point unit, inputting the terminated L2 packet from the tunnel packet end point unit to the virtual port of the corresponding tunnel, performing L2 switching including mac learning and flooding of unknown unicast packet and non-unicast packet based on header information of the L2 packet, and transmitting the L2 packet to a destination virtual port;
   adding to the packet an L3 tunnel header that has an IP address of an tunnel end point associated with a VSI output virtual port of the packet as a destination address and an IP address of the proxy tunnel end point unit as a source address; and transmitting a tunneled packet to a second tunnel end point unit of the second node unit that is a destination of transmission based on destination virtual port information, wherein the first tunnel end point unit of the first node unit transmits all packets to only a proxy tunnel end point unit Instead of a second tunnel end point unit of the second node unit, wherein a source L3 address of all packets being transmitted to the second tunnel end point unit is an L3 address of the proxy tunnel end point unit.

4. The method according to claim 3, further comprising after the generating of a VSI, generating the virtual port corresponding to each of the tunnel end point units on the VSI or generating the virtual port for only tunnel end point units belonging to the VNID that the VSI represents, and transmitting the packet to the second tunnel end point unit via the virtual port.

5. A communication system for scalable network virtualization, the system comprising:

a plurality of node units including a first node unit and second node unit, each node unit including a tunnel end point unit; and a plurality of proxy tunnel end point units of a proxy tunnel end point apparatus comprise:

one or more processors configured to collect information on each of a plurality of tunnel end point units of a plurality of node units;

generate a tunnel for unicast to be connected to the each tunnel end point unit of the plurality of node units;

generate a VSI (Virtual Switching Instance) corresponding to a VNID (Virtual Network Identifier), which is set for a virtual network using the tunnel;

receive a packet through the tunnel from a first tunnel end point unit of the first node unit using a proxy tunnel end point unit, terminate the tunnel, extract VNID information related to the VNID where the packet belongs to from a tunnel header of the received packet, and transmit the terminated L2 packet to the VSI corresponding to the VNID;

generate a virtual port corresponding to the tunnel that terminated in the tunnel packet end point unit, inputting the terminated L2 packet from the tunnel packet end point unit to the virtual port of the corresponding tunnel, and perform L2 switching including mac learning and flooding of unknown unicast packet and non-unicast packet based on the header information of the L2 packet and to transmit the L2 packet to a destination virtual port; and add to the packet the L3 tunnel header that has an IP address of an tunnel end point unit associated with a VSI output virtual port of the packet as a destination address and an IP address of the proxy tunnel end point unit as a source address and transmit a tunneled packet to a second tunnel endpoint unit of the second node unit that is a destination of transmission, based on destination virtual port information at the VSI, wherein the first tunnel end point unit of the first node unit transmits all packets to only a proxy tunnel end point unit instead of a second tunnel end point unit of the second node unit, wherein a source L3 address of all packets being transmitted to the second tunnel end point unit is an L3 address of the proxy tunnel end point unit.

6. The system according to claim 5, further comprising an additional proxy tunnel end point unit configured in parallel to the proxy tunnel end point unit, and configured to perform a same operation as the proxy tunnel end point unit for an additional VNID.

7. The system according to claim 6, in response to the additional VNID being added, sets the additional VNID to the proxy tunnel end point unit or the additional proxy tunnel end point unit.

* * * * *